(12) United States Patent
Tamatsu

(10) Patent No.: US 7,377,309 B2
(45) Date of Patent: May 27, 2008

(54) VEHICLE AIR CONDITIONING APPARATUS

(75) Inventor: Takeshi Tamatsu, Nagoya (JP)

(73) Assignee: Denso Corporation, Kariya (JP)

(*) Notice: Subject to any disclaimer, the term of this patent is extended or adjusted under 35 U.S.C. 154(b) by 415 days.

(21) Appl. No.: 10/818,236

(22) Filed: Apr. 5, 2004

(65) Prior Publication Data

US 2004/0200611 A1 Oct. 14, 2004

(30) Foreign Application Priority Data

Apr. 10, 2003 (JP) .............................. 2003-106743

(51) Int. Cl.
*B60H 1/00* (2006.01)

(52) U.S. Cl. .................. 165/202; 165/203; 165/42; 165/43; 237/12.3 A; 237/12.3 B; 454/156; 454/160; 454/161

(58) Field of Classification Search ............... 165/202, 165/203, 42, 43; 237/12.3 A, 12.3 B; 454/156, 454/160, 161

See application file for complete search history.

(56) References Cited

U.S. PATENT DOCUMENTS

| | | | |
|---|---|---|---|
| 6,148,904 A | | 11/2000 | Tsunooka et al. |
| 6,352,102 B1 * | | 3/2002 | Takechi et al. ............... 165/42 |
| 6,415,857 B1 * | | 7/2002 | Nakamura et al. .......... 165/204 |
| 6,609,389 B2 | | 8/2003 | Ozeki et al. |
| 7,082,990 B1 * | | 8/2006 | Uemura et al. ............. 165/203 |

FOREIGN PATENT DOCUMENTS

| | | | |
|---|---|---|---|
| JP | 55068416 A | * | 5/1980 |
| JP | 10-109523 | | 1/1998 |
| JP | 10-58956 | | 3/1998 |
| JP | 10109523 A | * | 4/1998 |
| JP | 10297251 A | * | 11/1998 |
| JP | 11-235915 | | 8/1999 |

OTHER PUBLICATIONS

Examination Report dated Feb. 1, 2006 in corresponding GB Application No. 0408098.2.
Search Report dated Sep. 9, 2004 in corresponding GB Application No. 0408098.2.
Office Action in corresponding Japanese Application No. 2003-106743 mailed Aug. 7, 2007.

* cited by examiner

*Primary Examiner*—John K Ford
(74) *Attorney, Agent, or Firm*—Harness, Dickey & Pierce, PLC

(57) ABSTRACT

In a unit case of a vehicle air conditioning apparatus, air mix chamber is not provided. Cooled air cooled by an evaporator and heated air heated by a heater core are directly introduced to a face opening and a foot opening of the case and then mixed in a face duct and a foot duct. The case has a guide for directing a flow of the heated air or the cooled air. The guide, the foot opening and the face opening are arranged such that the amount of heated air passing through the foot opening is larger than that of the cooled air and the amount of cooled air passing through the face opening is larger than that of the heated air in a bi-level mode. Accordingly, a temperature of air blown from a foot outlet into a passenger compartment is different from that of air blown from a face outlet.

25 Claims, 5 Drawing Sheets

VEHICLE AIR CONDITIONING APPARATUS

CROSS REFERENCE TO RELATED APPLICATION

This application is based on Japanese Patent Application No. 2003-106743 filed on Apr. 10, 2003, the disclosure of which is incorporated herein by reference.

FIELD OF THE INVENTION

The present invention relates to a vehicle air conditioning apparatus capable of performing an air-conditioning operation in a bi-level mode. More particularly, the present invention relates to an air conditioning apparatus for air-conditioning a vehicle rear seat space.

BACKGROUND OF THE INVENTION

In a vehicle having a large rear space such as a minivan, it is proposed to perform air-conditioning operation for the rear space independently from a front space. An air conditioning apparatus for a vehicle rear space is for example disclosed in Japanese Unexamined Patent Document No. JP-A-10-109523.

In the air-conditioning apparatus, as shown in FIG. 9, a blower fan 901 is arranged in a blower case 909 in a form of scroll and is rotated by a blower motor 910, which is driven by a power from a vehicle-mounted battery. The blower fan 901 sucks an inside air inside of a passenger compartment through a suction port 908 and blows the air into a cooler case 914, which is provided at a position downstream of the blower case 909. In the cooler case 914, an evaporator 902 performs heat exchange between a refrigerant flowing therein and the air blown by the blower fan 901, thereby cooling the air. A heater case 915 is connected to a downstream position of the cooler case 914. In the heater case 915, a heater core 904 is provided on a side adjacent to the passenger compartment and an air mix door 903 is provided on a side adjacent to the outside of the vehicle. The heater core 904 performs heat exchange between an engine cooling water and the cooled air having passed through the evaporator 902, thereby heating the air. The air mix door 903 can be moved to an optional position (air mix mode) between a position (MAX HOT) where the air is entirely introduced toward the heater core 904 and a position (MAX COOL) where the air is entirely introduced toward a cooled air bypass passage.

Further, in the heater case 915, an air mix chamber 911 is formed at a position downstream of the bypass passage and the heater core 904. Thus, the heated air passed through the heater core 904 and the cooled air passed through the bypass passage merge with each other in the air mix chamber 911. The mixed air is distributed toward a roof opening 906 and a foot opening 907 by a mode door 905. The mode door 905 is selectively set to a roof air-blowing mode position, a foot air-blowing mode position, or a bi-level mode position. In the roof air-blowing mode, the air is entirely introduced toward the roof opening 906. In the foot air-blowing mode, the air is entirely introduced toward the foot opening 907. In the bi-level mode, the mode door 905 is set to an optional position between the roof air-blowing mode position and the foot air-blowing mode position so that the mixed air is divided toward the roof opening 906 and the foot opening 907 with a desired ratio. Here, the blower unit 909, the cooler case 914, and the heater case 915 are located in a space between a side trim 912 and an outer panel 913 that defines an outer wall of a body.

Because the space of the air mix chamber 911 is reduced to improve mountability of the air conditioning apparatus to the rear space of the vehicle, the heated air passed through the heater core 904 is forcibly directed toward the air mix chamber 911 by a guide 916. Therefore, it is likely to be difficult to maintain the volumes of air blown from the respective air-blowing outlets sufficiently. On the other hand, the space between the side trim 912 and the outer panel 913 is limited. Therefore, it is required to further improve the mountability of the vehicle rear seat air conditioning apparatus. Further, in the bi-level mode, it is required to control air temperature such that the air blown toward a passenger's foot area is hotter than the air blown toward a passenger's face area.

SUMMARY OF THE INVENTION

The present invention is made in view of the above issue, and it is an object of the present invention to provide a compact air conditioning apparatus for a vehicle, which is capable of making temperature differences between air blown from respective air-blowing outlets while maintaining sufficient amounts of air at the outlets.

According to an air conditioning apparatus for a vehicle of the present invention, an air conditioning case defines an air passage through which air blown by an air blowing device flows. The air conditioner case forms a first opening and a second opening at a downstream position of the air passage. A first heat exchanger for cooling air and a second heat exchanger for heating air are accommodated in the air conditioner case. The case further defines a bypass passage through which cooled air cooled by the first heat exchanger flows while bypassing the second heat exchanger. A passage-switching door is provided to distribute the cooled air toward the bypass passage and the heater core. A mode-switching door is provided to distribute the cooled air bypassed the second heat exchanger and heated air heated by the second heat exchanger toward the first opening and the second opening. A first duct is connected to the first opening for leading air from the first opening to a passenger compartment. A second duct is connected to the second opening for leading air from the second opening to a passenger compartment. Further, a guide is provided in the air conditioner case at a position upstream of the mode-switching door.

In the air conditioner case, the first opening is disposed to open in a flow direction of the cooled air of the bypass passage and the guide is disposed such that a flow of the heated air is directed toward the second opening.

Accordingly, in a bi-level mode, the amount of the heated air passing through the second opening is larger than that of the cooled air by a positional relation between the guide and the second opening. Also, since the first opening is open in the flow direction of the cooled air of the bypass passage, the amount of the cooled air passing through the first opening is larger than that of the heated air. Therefore, a temperature of air blown from a second outlet of the second duct is higher than that of air blown from a first outlet of the first duct. When the second outlet is located at a lower position and the first outlet is located at a higher position in the passenger compartment, a passenger's foot area is heated more than a passenger's face area in the bi-level mode.

Further, an air mix chamber for mixing the cooled air and the heated air is not provided in the air conditioner case. The heated air and the cooled air are generally mixed in the first duct and the second duct after passing through the first opening and the second opening. Accordingly, the size of the air conditioning apparatus is reduced. Also, the amounts of air blown from the respective air outlets can be sufficiently maintained.

Alternatively, the second opening can be disposed to open in a flow direction of the heated air and the guide is disposed such that a flow direction of the cooled air bypassed the second heat exchanger is directed toward the first opening. The heated air and the cooled air are directly introduced toward the first opening and the second opening and mixed in the first duct and the second duct. In the bi-level mode, the amount of cooled air passing through the first opening is larger than that of the heated air by the positional relation between the guide and the first opening. Also, since the second opening is open in the flow direction of the heated air, the amount of air passing through the second opening is larger than that of the cooled air.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Embodiments of the present invention will be described hereinafter with reference to the drawings.

First Embodiment

Figure 1:
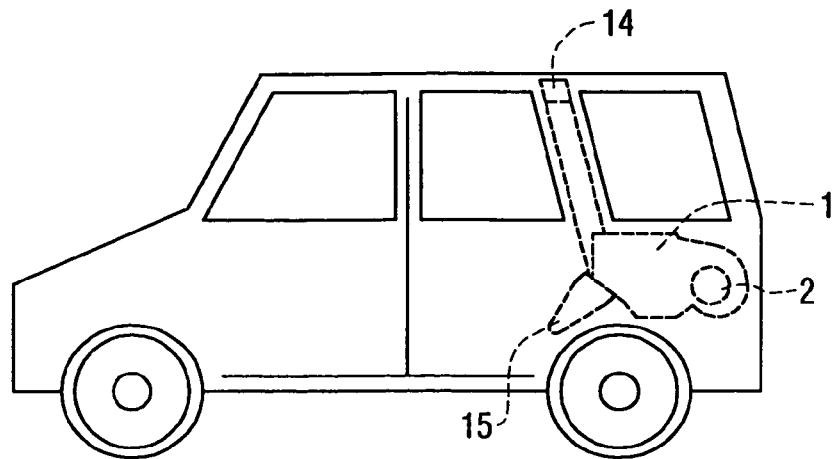
FIG. 1 is a schematic view of an air conditioning apparatus mounted in a vehicle rear space according to a first embodiment of the present invention.
Figure 2A:
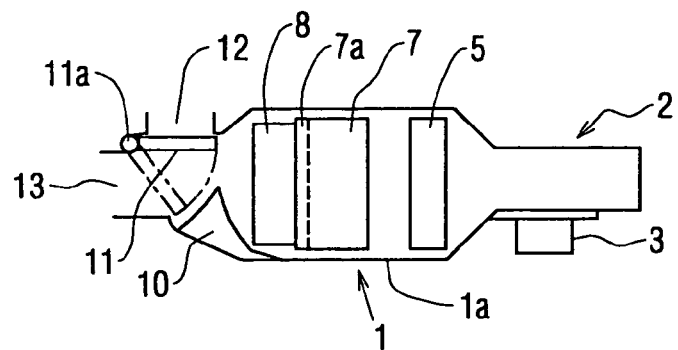
FIG. 2A is a schematic cross-sectional view of the air conditioning apparatus taken along in a horizontal direction according to the first embodiment of the present invention.
Figure 2B:
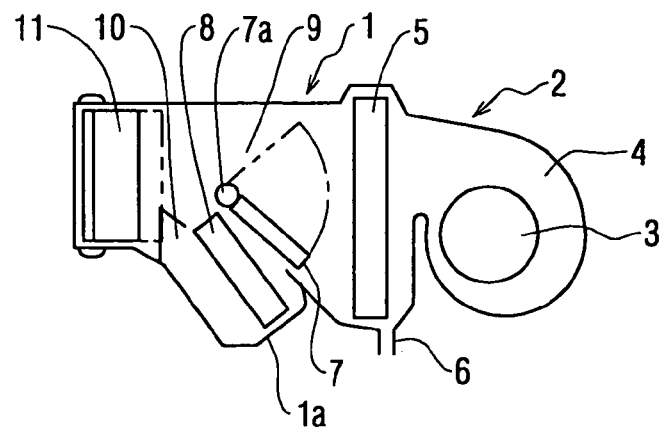
FIG. 2B is a schematic cross-sectional view of the air conditioning apparatus taken along in a vertical direction according to the first embodiment of the present invention.

Referring to FIG. 1, a vehicle air conditioning apparatus of the embodiment is for example mounted in a rear space of a vehicle, especially, in a space between a rear seat side trim (not shown) and an outer panel (not shown) forming a body outside wall on an assistant driver's seat side. A ventilation system of the air conditioning apparatus is constructed of an air conditioning unit 1 and a blower unit 2, as shown in FIGS. 2A. and 2B.

The blower unit 2 has a blower motor 3 driven by a battery (not shown) and a blower fan 4 rotated by the blower motor 3. The blower fan 4 blows air toward the air conditioning unit 1.

The air conditioning unit 1 has a case 1a. An evaporator (first heat exchanger) 5 and a heater core (second heat exchanger) 8 are accommodated in the case 1a. The evaporator 5 is for example produced by alternately stacking flat tubes and corrugated fins and integrally connecting them by brazing. Each of the flat tubes is constructed by joining a pair of metal sheets made of such as aluminum. The evaporator 5 performs heat exchange between a refrigerant flowing through the flat tubes and air passing through the corrugated fins, thereby cooling the air. The air introduced in the air conditioning unit 1 is dehumidified and cooled while passing through the evaporator 5. A drain port 6 is provided below the evaporator 5 in the case 1a. Drain water generated by condensation of moisture in the air of the evaporator 5 is collected and discharged from a drain port 6 to the outside of the air conditioning unit 1.

An air mix door 7 is provided downstream of the evaporator 5. The air mix door 7 channels or distributes the cooled air passed through the evaporator 5 toward the heater core 8 and a cooled air bypass passage 9, which is formed above the heater core 8 in the case 1a. The air mix door 7 is held rotatable about a rotation shaft 7a that is placed in a horizontal direction. The air mix door 7 is rotated up and down with respect to a vehicle body by a servomotor (not shown).

Figure 5A:
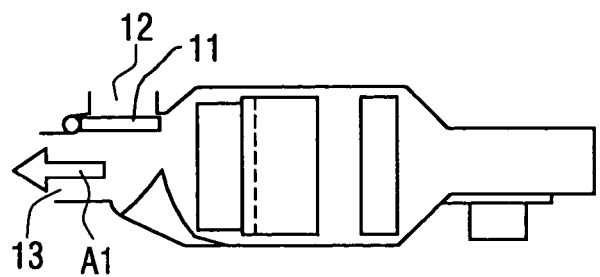
FIG. 5A is a schematic cross-sectional view of the air conditioning apparatus in a face mode according to the first embodiment of the present invention.
Figure 5B:
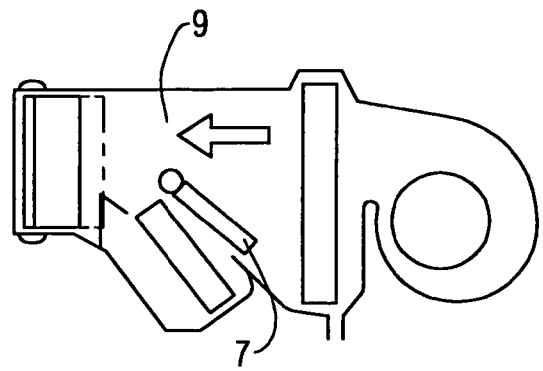
FIG. 5B is a schematic cross-sectional view of the air conditioning apparatus in a maximum cooling operation according to the first embodiment of the present invention.
Figure 6A:
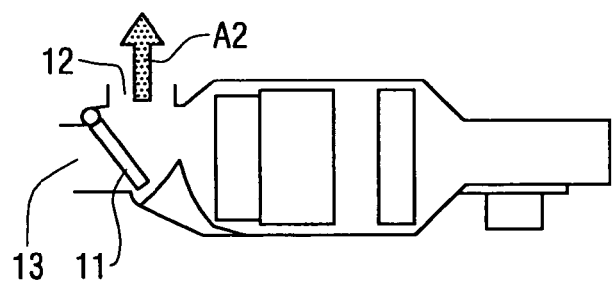
FIG. 6A is a schematic cross-sectional view of the air conditioning apparatus in a foot mode according to the first embodiment of the present invention.
Figure 6B:
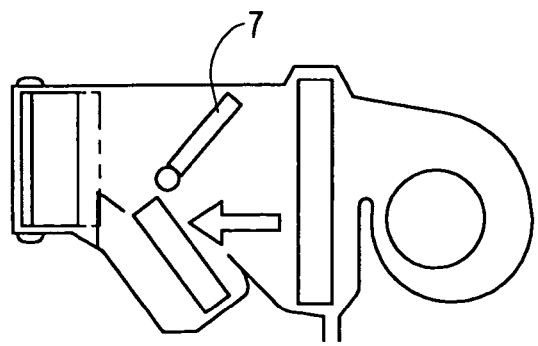
FIG. 6B is a schematic cross-sectional view of the air conditioning apparatus in a maximum heating operation according to the first embodiment of the present invention.
Figure 7A:
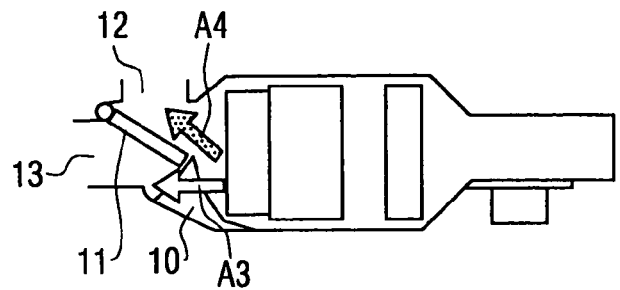
FIG. 7A is a schematic cross-sectional view of the air conditioning apparatus in a bi-level mode according to the first embodiment of the present invention.
Figure 7B:
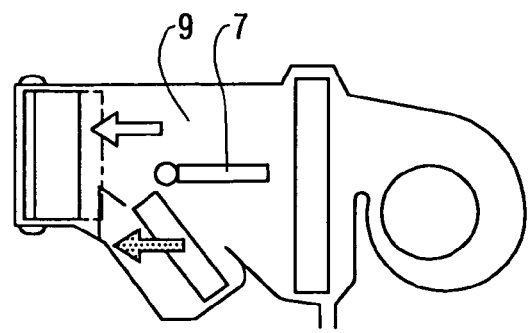
FIG. 7B is a schematic cross-sectional view of the air conditioning apparatus in an air mix operation according to the first embodiment of the present invention.

Specifically, the air mix door 7 can be moved to a maximum cooling position shown in FIG. 5B, a maximum heating position shown in FIG. 6B, and an air mix mode position shown in FIG. 7B. When the air mix door 7 is set to the maximum cooling position, the cooled air is entirely introduced into the cooled air bypass passage 9. When the air mix door 7 is set to the maximum heating position, the cooled air is entirely introduced toward the heart core 8 to be heated by the heater core 8. Further, when the air mix door 7 is set to the air mixing mode position, the cooled air is divided toward the cooled air bypass passage 9 and the heater core 8. Depending on an opening rate of the air mix door 7, the ratio of an air volume toward the bypass passage 9 to an air volume toward the heater core 8 is, adjusted, thereby to control the temperature of the air to be blown into a passenger compartment.

The cooled air distributed toward the heater core 8 by the air mix door 7 is heated by the heater core 8 and further sent downstream of the air conditioning unit 1. The heater core 8 is arranged in an inclined position, at a lower side of the air conditioning unit 1. The heater core 8 is produced by alternately stacking flat tubes and corrugated fins and integrating them by brazing. Each of the flat tubes is produced by joining metal sheets made of such as aluminum by welding to have a flat tube cross-section. Hot water (engine cooling water) flows inside of the heater core 8. The heater core 8 performs heat exchange between the hot water and the air passing through the corrugated fins, thereby heating the air.

On the other hand, the cooled air distributed into the cooled air bypass passage 9 by the air mix door 7 is introduced downstream of the air conditioning unit 1 while bypassing the heater core 8.

Figure 4:
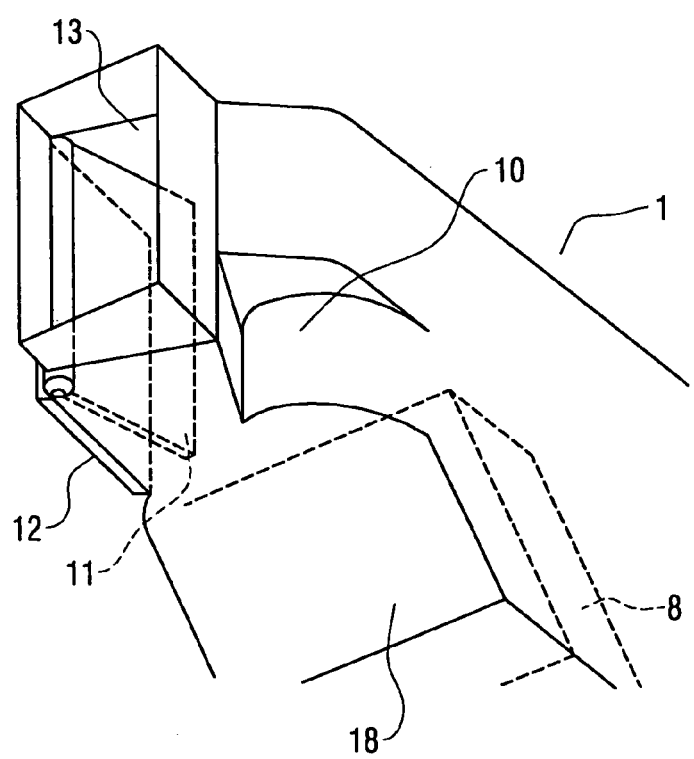
FIG. 4 is a schematic perspective view of an air conditioning unit according to the first embodiment of the present invention.

In the case 1a of the air conditioning unit 1, a guide 10 is provided at a downstream position of the heater core 8 as shown in FIG. 4. For example, the guide 10 is provided by a recess formed on a lower half portion of a side wall of the case 1a that defines the cooled air bypass passage 9. The case 1a further forms a sloped wall portion 18 at a position downstream of the heater core 8. The sloped wall portion 18 is parallel with the heater core 8, which is arranged in an inclined position. The sloped wall portion 18 extends from a position downstream of the heater core 8 to the guide 10 in the case 1a. The heated air passed through the heater core 8 flows along the sloped wall portion 18 and a flow direction of the heated air is mostly changed by the guide 10 toward a foot opening 12, which is one of openings of the air conditioning unit 1.

Figure 3:
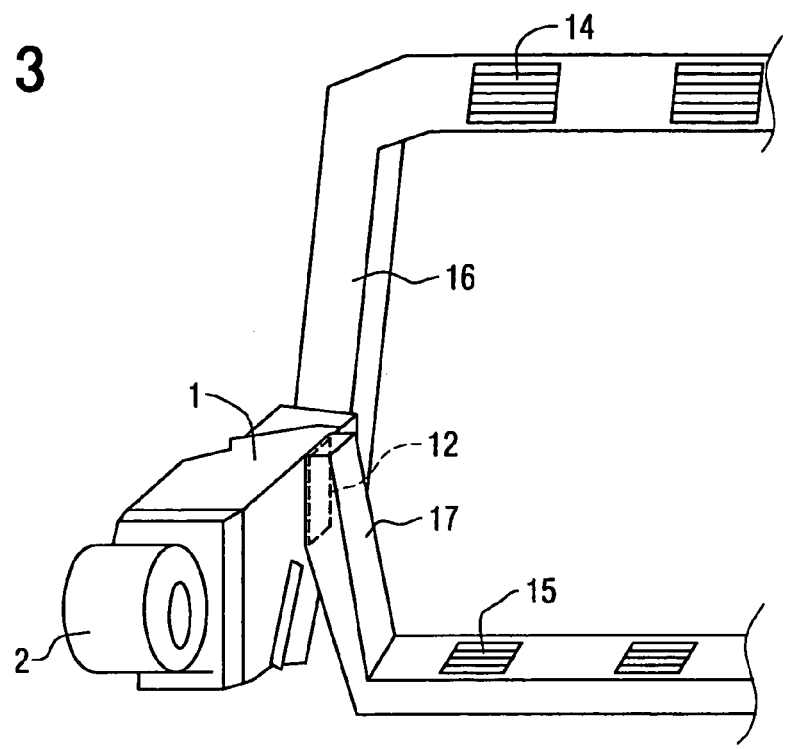
FIG. 3 is a schematic view of the air conditioning apparatus according to the first embodiment of the present invention.

The foot opening 12 is formed on the side wall of the case 1a that defines the cooled air bypass passage 9 and opposes the side wall on which the guide 10 is formed. In the embodiment, the foot opening 12 is for example open in a horizontal direction, that is, a vehicle left and right direction. Also, the foot opening 12 opens in a direction substantially perpendicular to the flow direction of the cooled air flowing in the cooled air bypass passage 9. As shown in FIG. 3, the foot opening 12 connects to a foot duct 17, which defines an air passage, and communicates with a foot outlet 15 located at a lower position in the passenger compartment, such as around a passenger's foot area.

Also, the case 1a forms a face opening 13 at a downstream position of the passage. The face opening 13 is formed forward of the passage. That is, the face opening 13 opens in a flow direction of the cooled air flowing through the cooled air bypass passage 9. As shown in FIG. 3, the face opening 13 connects to a face duct 16, which defines an air passage, and communicates with a face output 14 that is located at an upper position in the passenger compartment, such as above at a passenger's head area.

A mode switching door 11 is provided upstream of the foot opening 12 and the face opening 13. The mode switching door 11 distributes the heated air having passed through the heater core 8 and the cooled air having passed through the cooled air bypass passage 9 toward the foot opening 12 and the face opening 13. The mode-switching door 11 is rotatably held by a rotation shaft 11a that is arranged vertical and is driven in the right and left direction of the vehicle by a servomotor (not shown). Here, the rotation shaft 11a is arranged perpendicular to the rotation shaft 7a of the air mix door 7. Also, the rotation shaft 11a is perpendicular to the flow directions of the cooled air and the heated air.

When a face mode is selected by a switching operation of a mode-selecting switch (not shown), the mode switching door rotates to a position shown in FIG. 5A. In the face mode, the mode switching door 11 covers the foot opening 12 and exposes the face opening 13. Thus, the air flowing through the air conditioning unit 1 fully flows toward and passes through the face opening 13, as shown by an arrow A1 and therefore, is blown from the face outlet 14 into the passenger compartment.

When a foot mode is selected by the mode-selecting switch, the mode switching door 11 rotates to a position shown in FIG. 6A. In the foot mode, the mode switching door 11 covers the face opening 13 and exposes the foot opening 12. Thus, the air flowing through the air conditioning unit 1 fully flows toward and passes through introduced toward the foot opening 12 as shown by an arrow A2 and therefore is blown from the foot opening 15 into the passenger compartment.

When a bi-level mode is selected by the mode-selecting switch, the mode-switching door 11 rotates to a position shown in FIG. 7A. In the bi-level mode, the foot opening 12 and the face opening 13 are open. Thus, the cooled air passed through the cooled air bypass passage 9 and the heated air having passed through the heater core 8 are distributed to the foot opening 12 and the face opening 13, as shown by arrows A3, A4. So, the air is blown into the passenger compartment from both of the foot outlet 15 and the face outlet 14.

In the embodiment, the heater core 8 is arranged in an inclined position at the lower part of the air conditioning unit 1. The heated air flows along the sloped wall portion 18 of the case 1a and is generally directed toward the foot opening 12 by the guide 10.

The case 1a of the embodiment does not have an air mix chamber, which is generally provided in a conventional air conditioning case downstream of the cooled air bypass passage and the heater core and upstream of the face opening and the foot opening. In the embodiment, the heated air and the cooled air are directly introduced to at least one of the foot opening 12 and the face opening 13 before blending. Then, the heated air and the cooled air are mixed inside of the face duct 16 and the foot duct 17. Accordingly, the air mix chamber is not required. With this, the air conditioning apparatus can be reduced in size. Furthermore, since the flow direction of the air is not largely changed in the air passages, the cooled air and the heated air are sufficiently introduced into the face duct 16 and the foot duct 17 and blown from the respective outlets 14, 15 into the passenger compartment.

Also, in the bi-level mode, the heated air is sufficiently introduced toward the foot opening 12 by the positional relation between the guide 10 and the foot opening 12. Further, since the face opening 13 is open in the flow direction of the cooled air of the cooled air bypass passage 9, the cooled air is sufficiently introduced to the face opening 13. Then, the heated air and the cooled air are mixed in the respective ducts 16, 17. Since the amount of the heated air passing through the foot opening 12 is larger than the amount of the cooled air and the amount of the cooled air passing through the face opening 13 is larger than the amount of the heated air, the temperature of air blown from the foot outlet 15 is different from the temperature of air blown from the face outlet 14.

Second Embodiment

Figure 8A:
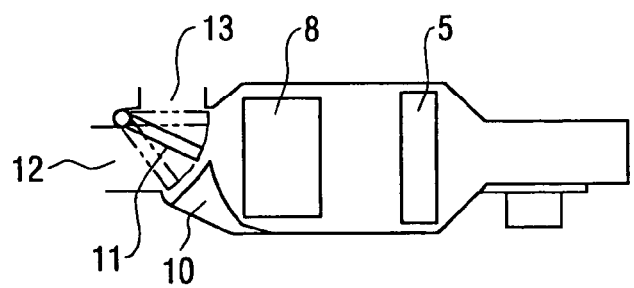
FIG. 8A and FIG. 8B are schematic cross-sectional views of the air conditioning apparatus according to a second embodiment of the present invention.
Figure 8B:
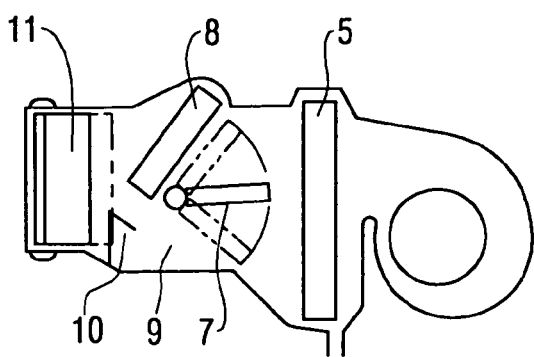
Figure 9:
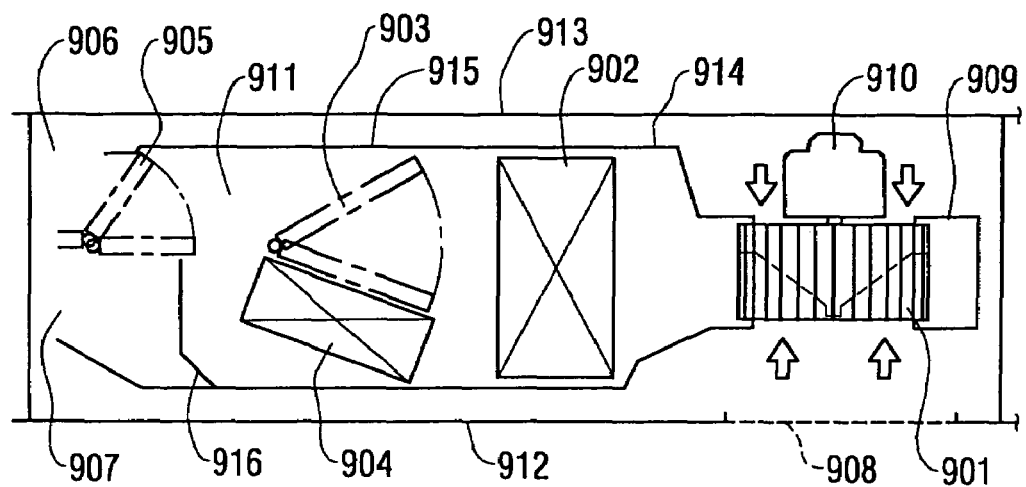
FIG. 9 is a schematic cross-sectional view of an air conditioning apparatus for a vehicle rear seat of a prior art.

Referring to FIGS. 8A and 8B, in the second embodiment, the position of the foot opening 12 and the face opening 13 are replaced. Also, the heater core 8 is arranged at an upper portion in the air conditioning unit 1 and the cooled air bypass passage is formed below the heater core 8.

The guide 10 is arranged downstream position of the cooled air bypass passage 9. The guide 10 is disposed to direct the flow of the cooled air passing through the cooled air bypass passage 9 toward the face opening 13. Similar to the first embodiment, the heated air and the cooled air are mixed in the face duct 16 and the foot duct 17. Therefore, the air mix chamber is not required in the case 1a.

In the bi-level mode, the cooled air can be sufficiently introduced toward the face opening 13 by the positional relation between the guide lo and the face opening 13. Since the foot opening 12 is open in the flow direction of the heated air having passed through the heater core 8, the heated air can be sufficiently introduced toward the foot opening 12. Accordingly, since the amount of the cooled air passing through the face opening 13 is larger than the amount of the heated air and the amount of the heated air passing through the foot opening 12 is larger than that of the cooled air, the temperature of air blown from the face outlet 14 is differentiated from the temperature of air blown from the foot opening 12.

In the embodiment, the face outlet 14 is located above the passenger's head area and the foot outlet 15 is located around the passenger's foot area. However, the positions of the face outlet. 14 and the foot outlet 15 are not limited to the above. For example, the face outlet 14 and the foot outlet 15 can be arranged at positions where it is desired to make temperature differences in the compartment in the bi-level mode.

The present invention should not be limited to the disclosed embodiment, but may be implemented in other ways without departing from the spirit of the invention.

What is claimed is:

1. An air conditioning apparatus for performing an air conditioning operation in a rear space of a passenger compartment of a vehicle, the rear space being on a rear side of a front seat of the vehicle, the apparatus comprising:
   an air blowing device for blowing air;
   an air conditioner case mounted adjacent to the rear space of the passenger compartment of the vehicle defining an air passage through which the air blown by the air blowing device flows, the case forming a first opening and a second opening at a downstream end of the air passage;
   a first heat exchanger provided in the air conditioner case for cooling the air blown by the air blowing device;
   a second heat exchanger provided in the air conditioner case for heating cooled air that has passed through the first heat exchanger;
   a bypass passage provided in the air conditioner case to allow the cooled air to pass therethrough while bypassing the second heat exchanger;
   a passage-switching door provided in the air conditioner case to distribute the cooled air toward the second heat exchanger and the bypass passage;
   a mode-switching door provided in the air conditioner case to distribute the cooled air bypassed the second heat exchanger and heated air heated by the second heat exchanger toward the first opening and the second opening;
   a guide provided at a position upstream of the mode-switching door;
   a first duct connected to the first opening for leading air from the first opening to an upper area of the passenger compartment; and
   a second duct connected to the second opening for leading air from the second opening to a lower area of the passenger compartment; wherein
   the first opening is aligned with a flow direction of the cooled air passing through the bypass passage;
   the second heat exchanger is located under the bypass passage,
   the second opening is disposed on a first side wall of the air conditioner case,
   the guide is disposed on a lower portion of a second side wall of the air conditioner case, the second side wall being opposed to the first side wall,
   the guide projects from the second side wall toward the second opening for directing the heated air toward the second opening.

2. The air conditioning apparatus according to claim 1, wherein the mode-switching door is held rotatable about a rotation axis and is disposed such that the rotation axis is perpendicular to flow directions of the cooled air and the heated air.

3. The air conditioning apparatus according to claim 1, wherein the passage-switching door is held rotatable about a rotation axis and the mode-switching door is held rotatable about a rotation axis, wherein the passage-switching door and the mode-switching door are disposed such that the rotation axes are perpendicular to each other.

4. The air conditioning apparatus according to claim 1, wherein the first duct defines a first outlet through which the air is blown into the passenger compartment and the second duct defines a second outlet through which the air is blown into the passenger compartment, wherein the first outlet is located at a position higher than that of the second outlet in the passenger compartment.

5. The air conditioning apparatus according to claim 1, wherein
   the second heat exchanger is inclined such that an upper end thereof is located closer to the downstream end of the air conditioner case than a lower end thereof,
   the air conditioner case forms an inclined bottom wall that is substantially parallel to the second heat exchanger and located at a position directly downstream of the second heat exchanger across a clearance for directing the heated air toward the downstream end, and
   the guide is disposed directly above the inclined bottom wall such that the heated air flowing along the inclined bottom wall is partly directed toward the second opening.

6. The air conditioning apparatus according to claim 1, wherein the second heat exchanger is disposed in an inclined position and the case forms a sloped wall parallel to the second heat exchanger at a position between the second heat exchanger and the guide so that the flow of the heated air is directed toward the guide by the sloped wall and directed toward the second opening by the guide.

7. The air conditioning apparatus according to claim 1, wherein
   a foot opening is open in a direction substantially perpendicular to an opening direction of the first opening.

8. The air conditioning apparatus according to claim 1, wherein
   the mode-switching door is a plate door having a rotation shaft that extends in a vertical direction and configured to open and close the first opening and the second opening.

9. The air conditioning apparatus according to claim 1, wherein
   the mode-switching door is configured to open and close the first and second openings, and
   when the mode-switching door is moved to a bi-level mode position at which the first opening and the second opening are opened, an end of the mode-switching door is adjacent to a projecting end of the guide.

10. An air conditioning apparatus for performing an air conditioning operation in a rear space of a passenger compartment of a vehicle, the rear space being on a rear side of a front seat of the vehicle, the apparatus comprising:
    an air blowing device for blowing air;
    an air conditioner case mounted adjacent to the rear space of the passenger compartment of the vehicle defining an air passage through which the air blown by the air blowing device flows, the case forming a first opening providing air flow from the air conditioning case in a first direction and a second opening providing air flow from the air conditioning case in a second direction downstream of the air passage;

a first heat exchanger provided in the air conditioner case for cooling air;

a second heat exchanger provided in the air conditioner case for heating air;

a passage-switching door provided in the air conditioner case to distribute cooled air cooled by the first heat exchanger toward the second heat exchanger and a bypass passage that is defined such that the cooled air bypasses the second heat exchanger, the second heat exchanger being disposed under the bypass passage;

a mode-switching door provided in the air conditioner case to distribute the cooled air bypassed the second heat exchanger and heated air heated by the second heat exchanger toward the first opening and the second opening;

a guide provided at a position upstream of the mode-switching door;

a first duct connected to the first opening for leading air from the first opening to the passenger compartment; and a second duct connected to the second opening for leading air from the second opening to the passenger compartment, wherein the first direction of the first opening is aligned with a flow direction of the cooled air passing through the bypass passage and the guide is disposed such that the heated air passing through the second heat exchanger is directed by the guide to be aligned with the second direction of the second opening;

the second opening is formed on a first side of the air conditioner case;

the guide is disposed on a second side of the air conditioner case opposite to the first side at a position lower than the bypass passage;

the guide projects from the second side toward the second opening; and the mode-switching door is a plate door having an axis of rotation in a substantially vertical direction.

11. The air conditioning apparatus according to claim 10, wherein the first direction is generally perpendicular to the second direction.

12. The air conditioning apparatus according to claim 10, wherein the passage-switching door is held rotatable about a rotation axis and the mode-switching door is held rotatable about a rotation axis, wherein the passage-switching door and the mode-switching door are disposed such that the rotation axes are perpendicular to each other.

13. The air conditioning apparatus according to claim 10, wherein the guide is provided by a recess formed on the case.

14. The air conditioning apparatus according to claim 10, wherein the second heat exchanger is disposed in an inclined position and the case forms a sloped wall parallel to the second heat exchanger at a position between the second heat exchanger and the guide so that the flow of the heated air is directed toward the guide by the sloped wall and directed toward the second opening by the guide.

15. An air conditioning apparatus for a vehicle, comprising:

an air blowing device for blowing air;

an air conditioner case defining an air passage through which the air blown by the air blowing device flows, the case forming a first opening and a second opening downstream of the air passage;

a first heat exchanger provided in the air conditioner case for cooling air;

a second heat exchanger provided in the air conditioner case for heating air;

a passage-switching door provided in the air conditioner case to distribute cooled air cooled by the first heat exchanger toward the second heat exchanger and a bypass passage having a cross-section that extends from the second heat exchanger to the air conditioner case in an alignment direction such that the cooled air bypasses the second heat exchanger;

a mode-switching door provided in the air conditioner case to distribute the cooled air that bypassed the second heat exchanger and heated air heated by the second heat exchanger toward the first opening and the second opening;

a guide provided at a position upstream of the mode-switching door;

a first duct connected to the first opening for leading air from the first opening to a passenger compartment in a first air flow direction; and a second duct connected to the second opening for leading air from the second opening to the passenger compartment in a second air flow direction, wherein the first air flow direction is generally parallel with a flow direction of the cooled air passing through the bypass passage and is generally perpendicular to the alignment direction and the guide is disposed on a side of the air conditioner case opposite said second opening such that a flow of the heated air is directed by the guide to be generally parallel with the second air flow direction; and the second air flow direction is generally perpendicular to the alignment direction.

16. The air conditioning apparatus according to claim 15, wherein the second opening is provided on a side wall of the air conditioner case that defines the air passage.

17. The air conditioning apparatus according to claim 15, wherein the first air flow direction is generally perpendicular to the second air flow direction.

18. The air conditioning apparatus according to claim 15, wherein the passage-switching door is held rotatable about a rotation axis and the mode-switching door is held rotatable about a rotation axis, wherein the passage-switching door and the mode-switching door are disposed such that the rotation axes are perpendicular to each other.

19. The air conditioning apparatus according to claim 15, wherein the guide is provided by a recess formed on the case.

20. The air conditioning apparatus according to claim 15, wherein the second heat exchanger is disposed in an inclined position and the case forms a sloped wall parallel to the second heat exchanger at a position between the second heat exchanger and the guide so that the flow of the heated air is directed toward the guide by the sloped wall and directed toward the second opening by the guide.

21. An air conditioning apparatus mounted on a rear portion of a passenger compartment of a vehicle the rear space being on a rear side of a front seat of the vehicle, the apparatus comprising:

an air blowing device for generating a flow of air;

an air conditioner case mounted adjacent to the rear space of the passenger compartment of the vehicle having a first end and a second end, the first end being in communication with the air blowing device, the second end including a face opening through which air to be introduced toward a rear upper area of the passenger compartment flows and a foot opening through which air to be introduced toward a rear lower area of the passenger compartment flows;

a first heat exchanger disposed in the air conditioner case for cooling air blown by the air blowing device;

a second heat exchanger disposed in a lower portion of the air conditioner case for heating cooled air that has passed through the first heat exchanger;

a bypass passage provided in the air conditioner case above the second heat exchanger for allowing the cooled air to bypass the second heat exchanger, the bypass passage extending from the first heat exchanger toward the second end of the air conditioner case; and a mode-switching door disposed to open and close the face opening and the foot opening, the mode-switching door has a rotation axis that extends in a substantially vertical direction, wherein the face opening is open in a direction substantially parallel to a longitudinal axis of the bypass passage, the foot opening is disposed on a first side of the air conditioner case, the air conditioner case further has a guide on a lower portion of a second side of the air conditioner case, the second side being opposed to the first side across the bypass passage in a substantially horizontal direction, and the guide is located downstream of the second heat exchanger and projects toward the foot opening for introducing a part of the heated air toward the foot opening.

22. The air conditioning apparatus according to claim 21, wherein the rotation shaft of the mode-switching door is located adjacent to the first side of the air conditioner case and is movable to a bi-level mode position at which the face and foot openings are open, and when the mode-switching door is at the bi-level mode position, an end of the mode-switching door is aligned with a projecting end of the guide.

23. The air conditioning apparatus according to claim 21, wherein the face and foot openings are located on a substantially same level as the bypass passage with respect to the vertical direction.

24. The air conditioning apparatus according to claim 23, wherein the air conditioner case has an inclined bottom wall between the first and second sides and at a position directly downstream of the second heat exchanger for introducing the heated air from the second heat exchanger in a diagonally upward direction, and the guide is disposed above the inclined bottom wall for introducing a part of the heated air flowing along the inclined bottom wall toward the foot opening.

25. The air conditioning apparatus according to claim 21, wherein the air conditioner case is mounted on a rear side trim space of a vehicle such that the longitudinal axis of the bypass passage extends in a vehicle front and rear direction, the second side of the air conditioner case is adjacent to an outer panel of the vehicle, and the first side of the air conditioner case is adjacent to an inside of the passenger compartment.

* * * * *